April 27, 1937.   S. W. DOBSON   2,078,484
EGG CLEANER
Filed Feb. 24, 1936
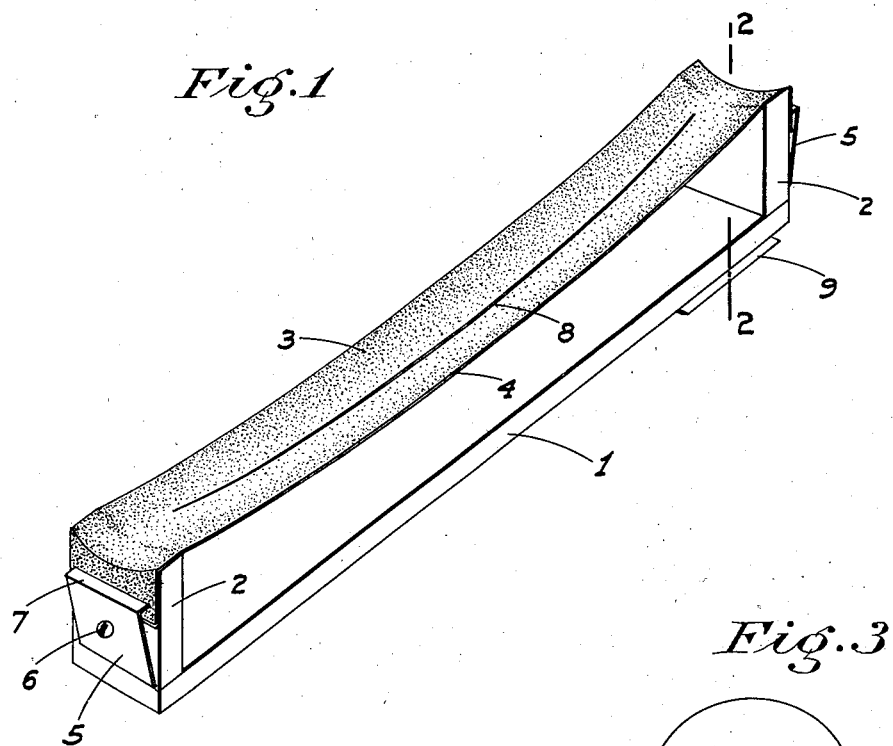
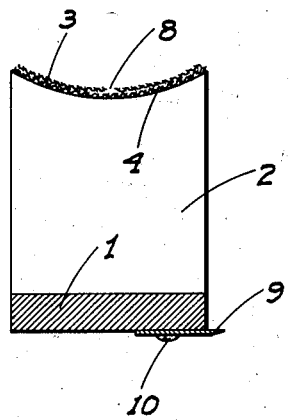
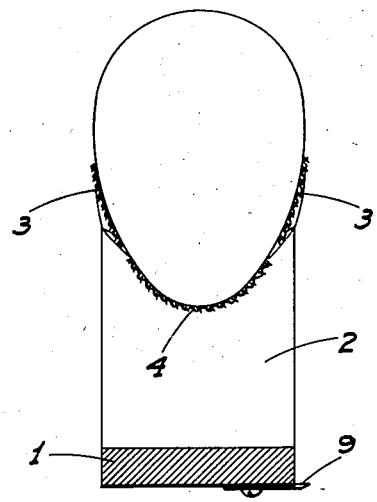
INVENTOR
S. W. Dobson
BY
ATTORNEY

UNITED STATES PATENT OFFICE 2,078,484

EGG CLEANER

Smith W. Dobson, Stockton, Calif.

Application February 24, 1936, Serial No. 65,469

5 Claims. (Cl. 51—187)

This invention relates generally to the poultry industry and is directed in particular to an egg cleaner.

Eggs, when removed from the nest, are often covered with a certain amount of dirt and excrement and it has heretofore required a great deal of time and labor to clean and polish the shells of the eggs.

It is therefore the principal object of my invention to provide an egg cleaner which will quickly and efficiently clean and polish the shell of the egg. With my cleaning device, it is of course necessary to handle each egg individually but the cleaning process may be carried out with more facility and in much less time than heretofore possible.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a perspective view of my egg cleaner.

Fig. 2 is a transverse vertical section on line 2—2 of Fig. 1.

Fig. 3 is a similar view taken toward the middle of the cleaner and illustrating an egg in position for cleaning.

Referring now more particularly to the characters of reference on the drawing, the egg cleaning device comprises a relatively long, flat base member 1, having end pieces 2 rigidly secured to and upstanding therefrom. The top edge of each end piece 2 is cut so as to present a concave surface as clearly shown in the drawing.

Two strips of suitable fabric indicated at 3 and 4 respectively are suspended in superimposed relation between the end pieces 2; the ends of the strips extending down the outer faces of the end pieces and being secured thereto by clamping plates 5. Each clamping plate is held in position by a screw 6 and is formed with a lip 7 which holds the fabric from slipping away from between the clamping plate and adjacent face of the end piece.

These two strips of fabric are provided with a suitable fine abrasive on their upper faces and the top strip 3 is formed intermediate its side edges with a longitudinally extending slit, indicated at 8, which terminates just short of the ends of the said strip.

My improved egg cleaner is also provided with a scraping blade 9 secured to the lower face of the base member 1 by screws 10 and projecting from the side edge of the base member a short distance.

In use, the above described device is employed to clean and polish an egg in the following manner:

Any large particles of dirt or excrement are scraped off the egg by means of the scraping blade 9. The egg is then placed with one end against the top strip 3 and is moved back and forth along the strip, and is also rotated about a vertical axis. This causes the portions of the strip on both sides of the slit to separate and ride up on the sides of the egg as clearly shown in Fig. 3. The end of the egg which extends through the now widened slit engages the lower strip 4. Thus: a portion of the sides of the egg and one end thereof are cleaned and polished by the abrasive surfaces as the egg is moved back and forth and allowed to turn around as so moved. To complete the cleaning, the egg is inverted and the process repeated on the other end.

Fig. 3 illustrates very clearly the manner in which the top strip "rides" the side of the egg while the end of the egg engages the lower strip. The fact that the strips assume a concave form when drawn over the concave edges of the end pieces makes it much easier to separate the top strip and position the egg, as shown in Fig. 3, for cleaning.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An egg cleaner comprising two relatively long strips of flexible material disposed in superimposed relation, abrasive material on the upper faces of both strips, the top strip being slit longitudinally intermediate its side edges, and means suspending the strips in such relation from each end thereof.

2. A device as in claim 1 in which the suspending means is arranged to cause the strips to assume a concave form from side to side.

3. An egg cleaner comprising a base member, end pieces upstanding from the base member, the upper edges of said end pieces being concave, two strips of flexible material having abrasive upper faces suspended in superimposed relation from the concave edges of the end pieces and clamps to secure the ends of the strips to the end pieces; the upper strip being slit longitudinally intermediate its side edges.

4. An egg cleaner comprising a relatively long strip of flexible material, an abrasive material on one face of the strip, and spaced elements supporting the flexible strip in suspended relation between its ends, said elements being arranged so that the strip as suspended is concave from side to side.

5. A device as in claim 4 in which the strip is slit longitudinally intermediate its side edges whereby those portions of the strip on each side of the slit and which are normally disposed in edge to edge relation may separate from each other upon movement of an egg along said strip.

SMITH W. DOBSON.